United States Patent
Engel

(10) Patent No.: US 7,190,364 B2
(45) Date of Patent: Mar. 13, 2007

(54) SYSTEM AND METHOD FOR POLYGON-SMOOTHING IN TEXTURE-BASED VOLUME RENDERING

(75) Inventor: Klaus D. Engel, West Windsor, NJ (US)

(73) Assignee: Siemens Medical Solution USA, Inc., Malvern, PA (US)

( * ) Notice: Subject to any disclaimer, the term of this patent is extended or adjusted under 35 U.S.C. 154(b) by 265 days.

(21) Appl. No.: 10/953,246

(22) Filed: Sep. 29, 2004

(65) Prior Publication Data

US 2006/0028480 A1 Feb. 9, 2006

Related U.S. Application Data

(60) Provisional application No. 60/600,429, filed on Aug. 9, 2004.

(51) Int. Cl.
*G06T 15/00* (2006.01)
(52) U.S. Cl. ............. 345/423; 345/630; 345/592; 345/420; 600/425
(58) Field of Classification Search ........... 345/423, 345/582, 420, 592, 630; 600/425
See application file for complete search history.

(56) References Cited

U.S. PATENT DOCUMENTS

| | | | | |
|---|---|---|---|---|
| 5,570,460 A * | 10/1996 | Ramanujam | ........... | 345/424 |
| 5,963,201 A * | 10/1999 | McGreggor et al. | ........ | 715/722 |
| 6,084,593 A * | 7/2000 | Gibson | ........... | 345/426 |
| 6,366,800 B1 * | 4/2002 | Vining et al. | ........... | 600/425 |
| 2004/0070582 A1 * | 4/2004 | Smith et al. | ........... | 345/419 |
| 2004/0125103 A1 * | 7/2004 | Kaufman et al. | ........... | 345/419 |
| 2004/0249303 A1 * | 12/2004 | Serra | ........... | 600/545 |
| 2005/0231503 A1 * | 10/2005 | Heng et al. | ........... | 345/420 |
| 2005/0253841 A1 * | 11/2005 | Brabec et al. | ........... | 345/419 |
| 2006/0114264 A1 * | 6/2006 | Weybrew et al. | ........... | 345/592 |
| 2006/0244758 A1 * | 11/2006 | Ruge | ........... | 345/592 |

OTHER PUBLICATIONS

Cabral, Brian; Cam, Nancy; Foran, Jim; "Accelerated Volume Rendering and Tomographic Reconstruction Using Texture Mapping Hardware;" Symposium on Volume Visualization, Proceedings of the 1994 symposium on Volume visualization, pp. 91-98 and 131.*

* cited by examiner

*Primary Examiner*—Mark Zimmerman
*Assistant Examiner*—Crystal Murdoch
(74) *Attorney, Agent, or Firm*—Donald B. Paschburg; F. Chau & Associates, LLC

(57) ABSTRACT

A system and method for polygon-smoothing in texture-based volume rendering is provided. The method comprises the steps of: downsizing a slice polygon and determining boundary polygons around the downsized slice polygon using a smoothing factor, wherein the downsized slice polygon comprises first vertices and the boundary polygons comprise second vertices; generating a falloff ramp between the first vertices of the downsized slice polygon and the second vertices of the boundary polygons; and rendering the downsized slice polygon with texture-based volume rendering and the boundary polygons with texture-based volume rendering and the falloff ramp.

21 Claims, 6 Drawing Sheets

SYSTEM AND METHOD FOR POLYGON-SMOOTHING IN TEXTURE-BASED VOLUME RENDERING

CROSS-REFERENCE TO RELATED APPLICATIONS

This application claims the benefit of U.S. Provisional Application No. 60/600,429, filed Aug. 9, 2004, the disclosure of which is herein incorporated by reference.

BACKGROUND OF THE INVENTION

1. Technical Field

The present invention relates to volume rendering, and more particularly, to polygon smoothing in texture-based volume rendering.

2. Discussion of the Related Art

A three-dimensional (3D) volume array of data, typically used in volume rendering, is assembled using a series of consecutive "slices" through a solid body being scanned, where each slice is a two-dimensional (2D) image array of data points. Each grid value of a 2D image array is called a picture element, or "pixel", while each grid value of a 3D volume array is called a volume element, or "voxel". The derivation of a 3D volume array is known in the art and readily obtainable using systems such as magnetic resonance (MR) imaging systems, computed tomography (CT) scanning systems, positron emission tomography (PET), and ultrasound scanning.

Methods for generating a 2D image from volumetric data can be classified as indirect and direct volume rendering techniques. Indirect methods generate and render an intermediate representation of the volume data, while direct methods display voxel data by evaluating an optical model, which describes how the volume emits, reflects, scatters, absorbs, and occludes light. Voxel densities are mapped to physical quantities describing light interaction at respective points in a 3D-space. During image synthesis, light propagation is computed by integrating light interaction effects along viewing rays based on an optical model. The corresponding integral is known as the volume rendering integral.

Object-order rasterization rendering algorithms, such as those implemented in consumer graphics hardware, are typically based on a scan-conversion of primitives (e.g., polygons, lines, and points). Data values generated during the scan-conversion (e.g., fragments) are blended into a frame buffer of the graphics hardware. Because volume data does not consist of such primitives, proxy geometry is defined for each individual slice through the volume data. Each slice is textured with corresponding data from the volume. The volume is reconstructed during rasterization of the slice polygon by applying a convolution of the volume data with a filter kernel. The entire volume is represented by a stack of such slices.

Conventional texture-based volume rendering techniques can be classified as view-aligned or object-aligned slicing methods depending on the orientation of the proxy geometry. For view-aligned slicing, the proxy geometry is oriented orthogonal to the viewing direction of a virtual camera. The volume data is represented by a block of voxel data (e.g., a 3D texture). For object-aligned slicing, the proxy geometry is oriented orthogonal to three main axes of the volume. A large number view- or object aligned slices of this voxel data are reconstructed during rendering using the proxy geometry, whose vertices are assigned texture coordinates that are interpolated by the graphics hardware to access the data. An example of a conventional volume rendering using 2D textures is shown in FIG. 1A and a conventional rendering using a 3D texture is shown in FIG. 1B.

Slicing, illustrated by the sliced polygons in FIGS. 1A and 1B, is a common technique used in graphics hardware-accelerated volume rendering. It provides good performance by load balancing a volume rendering algorithm between a vertex and fragment processor of the graphics hardware. In principle, slicing a volume using view-aligned slice polygons corresponds to stepping along straight rays while raycasting and is performed in a vertex stage. In contrast to the traditional raycasting algorithm, which steps along single rays one at a time, slicing steps along all rays at the same time. The integration along the rays is performed in the fragment stage.

One of the disadvantages of slicing is that slicing artifacts occur on slice boundaries as indicated by the arrows shown, for example, in FIG. 5A. This is due to adjacent slice polygons intersecting a bounding box of the volume having a small displacement. In other words, a slice polygon will cover a portion of the screen that is not covered by an adjacent slice polygon due to the perspective or orthographic projection. At the boundary of this region of the screen to the region that is covered by both polygons the sudden change of the number of integration steps typically leads to a discontinuity in the rendering result. These artifacts can be observed frequently in images generated with a conventional texture-based volume rendering algorithm.

To improve the quality of a volume rendered image additional slice polygons are computed thus decreasing an inter-slice distance and increasing the sampling rate. However, when increasing the sampling rate, the performance of the graphics hardware decreases. Therefore, relatively small sampling rates are used in volume rendering to achieve high frame-rates. However, this technique still results in a volume rendered image that includes artifacts.

Accordingly, there is a need for a volume rendering technique that reduces the effects of artifacts in a volume rendered image and that increases the performance of graphics hardware.

SUMMARY OF THE INVENTION

The present invention overcomes the foregoing and other problems encountered in the known teachings by providing a system and method for polygon-smoothing in texture-based volume rendering.

In one embodiment of the present invention, a method for polygon-smoothing in texture-based volume rendering, comprises: downsizing a slice polygon and determining boundary polygons around the downsized slice polygon using a smoothing factor, wherein the downsized slice polygon comprises first vertices and the boundary polygons comprise second vertices; generating a falloff ramp between the first vertices of the downsized slice polygon and the second vertices of the boundary polygons; and rendering the downsized slice polygon with texture-based volume rendering and the boundary polygons with texture-based volume rendering and the falloff ramp.

The method further comprises acquiring a three-dimensional (3D) volume of data. The 3D volume of data is acquired by one of a computed tomographic (CT), helical CT, x-ray, positron emission tomography (PET), fluoroscopic, ultrasound, and magnetic resonance (MR) imaging technique. The method comprises slicing the 3D volume of data into one or more slice polygons. The slice polygon is downsized by determining coordinates located between a center of the slice polygon and an original vertex position.

The boundary polygons are located in an area between outer edges of the downsized slice polygon and outer edges of the slice polygon. The smoothing factor defines a width of the boundary polygons, wherein the width of the boundary polygons is a width of the falloff ramp. The falloff ramp is generated by assigning a first alpha value to the first vertices of the downsized slice polygon and a second alpha value to the second vertices of the boundary polygons and performing a linear interpolation on the first and second alpha values.

The method further comprises clipping the slice polygon using clipping planes. The step of rendering the boundary polygons with texture-based volume rendering and the falloff ramp comprises multiplying an alpha value acquired from the downsized slice polygon during rendering with an alpha value associated with the falloff ramp at the boundary polygons.

In another embodiment of the present invention, a system for polygon-smoothing in texture-based volume rendering, comprises: a memory device for storing a program; a processor in communication with the memory device, the processor operative with the program to: downsize a slice polygon and determine boundary polygons around the downsized slice polygon using a smoothing factor, wherein the downsized slice polygon comprises inner vertices of the slice polygon and the boundary polygons comprise outer vertices of the slice polygon; generate a falloff ramp between the inner vertices of the slice polygon and the outer vertices of the slice polygon; and render the downsized slice polygon with texture-based volume rendering and the boundary polygons with texture-based volume rendering and the falloff ramp.

The processor is further operative with the program code to acquire a 3D volume of data from a solid body. The 3D volume of data is acquired by one of a CT, helical CT, x-ray, PET, fluoroscopic, ultrasound, and MR imaging technique. The processor is further operative with the program code to slice the 3D volume of data into one or more slice polygons. The slice polygon is downsized by determining coordinates located between a center of the slice polygon and an original vertex position.

The boundary polygons are located in an area between edges of the downsized slice polygon and edges of the slice polygon. The smoothing factor defines a width of the boundary polygons, wherein the width of the boundary polygons is a width of the falloff ramp. The falloff ramp is generated by assigning a first alpha value to the inner vertices of the slice polygon and a second alpha value to the outer vertices of the slice polygon and performing a linear interpolation on the first and second alpha values.

The processor is further operative with the program code to clip the slice polygon using clipping planes. The step of rendering the boundary polygons with texture-based volume rendering and the falloff ramp comprises multiplying an alpha value acquired from the downsized slice polygon during rendering with an alpha value associated with the falloff ramp at the boundary polygons.

In yet another embodiment of the present invention, a computer program product comprising a computer useable medium having computer program logic recorded thereon for polygon-smoothing in texture-based volume rendering, the computer program logic comprises: program code for downsizing a slice polygon and determining boundary polygons around the downsized slice polygon using a smoothing factor, wherein the downsized slice polygon comprises first vertices and the boundary polygons comprise second vertices; program code for generating a falloff ramp between the first vertices of the downsized slice polygon and the second vertices of the boundary polygons; and program code for rendering the downsized slice polygon with texture-based volume rendering and the boundary polygons with texture-based volume rendering and the falloff ramp.

In another embodiment of the present invention, a system for polygon-smoothing in texture-based volume rendering, comprises: means for downsizing a slice polygon and determining boundary polygons around the downsized slice polygon using a smoothing factor, wherein the downsized slice polygon comprises first vertices and the boundary polygons comprise second vertices; means for generating a falloff ramp between the first vertices of the downsized slice polygon and the second vertices of the boundary polygons; and means for rendering the downsized slice polygon with texture-based volume rendering and the boundary polygons with texture-based volume rendering and the falloff ramp.

In yet another embodiment of the present invention, a method for removing artifacts from a 3D volume of data acquired from a solid body during texture rendering, comprises: computing a slice polygon using the 3D volume of data and a slicing plane; computing a downsized polygon and border polygons surrounding the downsized polygon using a smoothing factor, wherein the downsized polygon comprises inner vertices of the slice polygon and the border polygons comprise outer vertices of the slice polygon; generating a linear alpha ramp between the inner vertices of the slice polygon and the outer vertices of the slice polygon; and rendering the downsized polygon with texture rendering and the border polygons with texture rendering and the linear alpha ramp. The method further comprises clipping the slice polygon using clipping planes and translating the slicing plane along a viewing direction.

The foregoing features are of representative embodiments and are presented to assist in understanding the invention. It should be understood that they are not intended to be considered limitations on the invention as defined by the claims, or limitations on equivalents to the claims. Therefore, this summary of features should not be considered dispositive in determining equivalents. Additional features of the invention will become apparent in the following description, from the drawings and from the claims.

DETAILED DESCRIPTION OF EXEMPLARY EMBODIMENTS

Figure 1A:
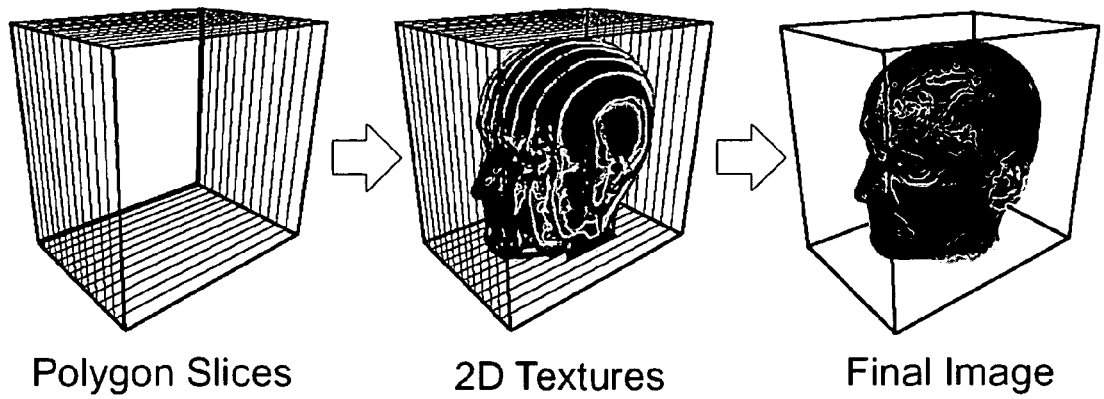
FIG. 1A is a sequence of images illustrating a conventional volume rendering technique using two-dimensional (2D) textures.
Figure 1B:
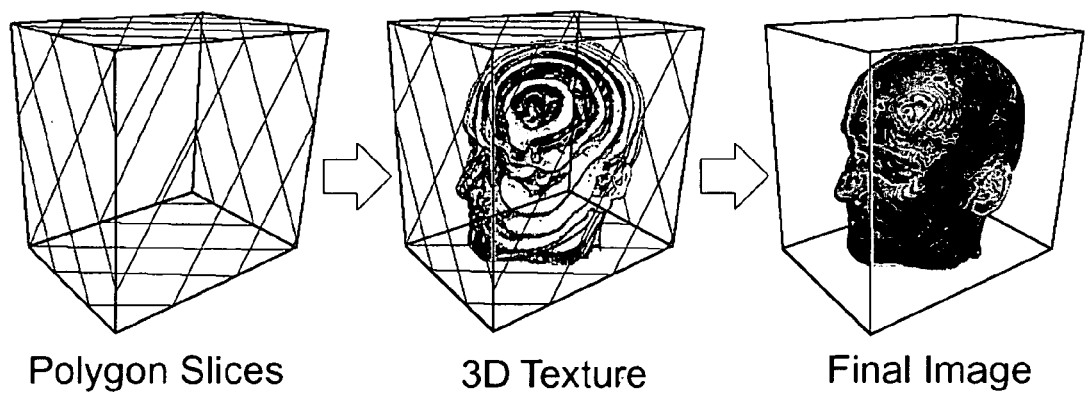
FIG. 1B is a sequence of images illustrating a conventional volume rendering technique using a three-dimensional (3D) texture.
Figure 2:
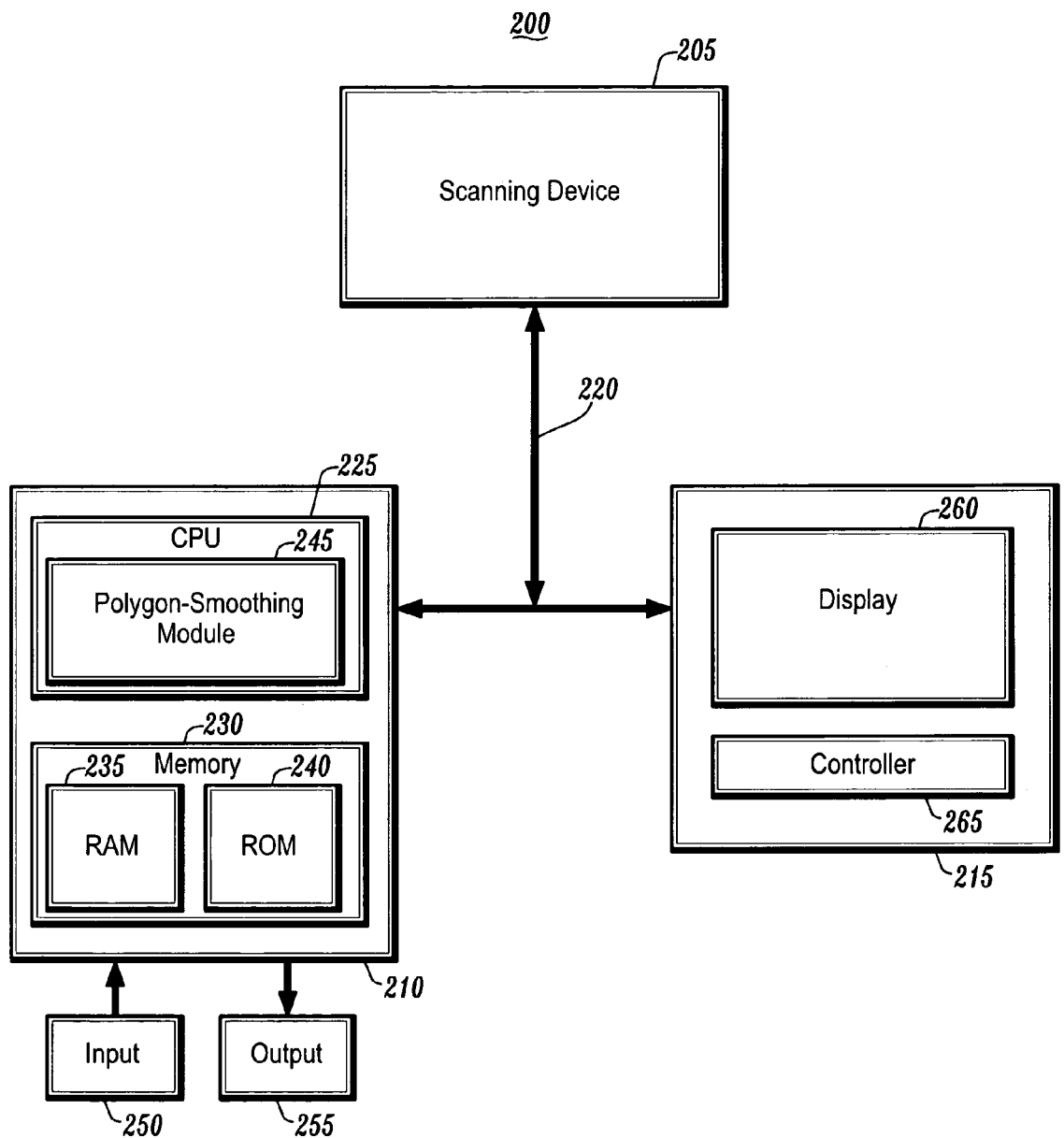
FIG. 2 is a block diagram of a system for polygon-smoothing according to an exemplary embodiment of the present invention.

FIG. 2 is a block diagram of a system 200 for polygon-smoothing in texture-based volume rendering according to an exemplary embodiment of the present invention. As shown in FIG. 2, the system 200 includes, inter alia, a scanning device 205, a personal computer (PC) 210 and an operator's console 215 connected over, for example, an Ethernet network 220. The scanning device 205 may be a magnetic resonance (MR) imaging device, a computed tomography (CT) imaging device, a helical CT device, a positron emission tomography (PET) device, a two-dimensional (2D) or three-dimensional (3D) fluoroscopic imaging device, a 2D, 3D, or four-dimensional (4D) ultrasound imaging device, etc.

The PC 210, which may be a portable or laptop computer, a personal digital assistant (PDA), etc., includes a central processing unit (CPU) 225 and a memory 230, which are connected to an input 250 and an output 255. The CPU 225 includes a polygon-smoothing module 245 that includes one or more methods for polygon-smoothing in texture-based volume rendering.

The memory 230 includes a random access memory (RAM) 235 and a read only memory (ROM) 240. The memory 230 can also include a database, disk drive, tape drive, etc., or a combination thereof. The RAM 235 functions as a data memory that stores data used during execution of a program in the CPU 225 and is used as a work area. The ROM 240 functions as a program memory for storing a program executed in the CPU 225. The input 250 is constituted by a keyboard, mouse, etc., and the output 255 is constituted by a liquid crystal display (LCD), cathode ray tube (CRT) display, printer, etc.

The operation of the system 200 is controlled from the operator's console 215, which includes a controller 265, for example, a keyboard, and a display 260, for example, a CRT display. The operator's console 215 communicates with the PC 210 and the scanning device 205 so that 2D image data collected by the scanning device 205 can be rendered into 3D data by the PC 210 and viewed on the display 260. It is to be understood that the PC 210 can be configured to operate and display information provided by the scanning device 205 absent the operator's console 215, using, for example, the input 250 and output 255 devices to execute certain tasks performed by the controller 265 and display 260.

The operator's console 215 further includes any suitable image rendering system/tool/application that can process digital image data of an acquired image dataset (or portion thereof) to generate and display 2D and/or 3D images on the display 260 using, for example, a 3D graphics card. More specifically, the image rendering system may be an application that provides 2D/3D rendering and visualization of image data, and which executes on a general purpose or specific computer workstation. The PC 210 may also include an image rendering system/tool/application for processing digital image data of an acquired image dataset to generate and display 2D and/or 3D images.

As shown in FIG. 2, the polygon-smoothing module 245 is also used by the PC 210 to receive and process digital image data, which as noted above, may be in the form of raw image data, 2D reconstructed data (e.g., axial slices), or 3D reconstructed data such as volumetric image data or multi-planar reformats, or any combination of such formats. The data processing results can be output from the PC 210 via the network 220 to an image rendering system in the operator's console 215 for generating 2D and/or 3D renderings of image data in accordance with the data processing results, such as segmentation of organs or anatomical structures, color or intensity variations, and so forth.

Figure 3:
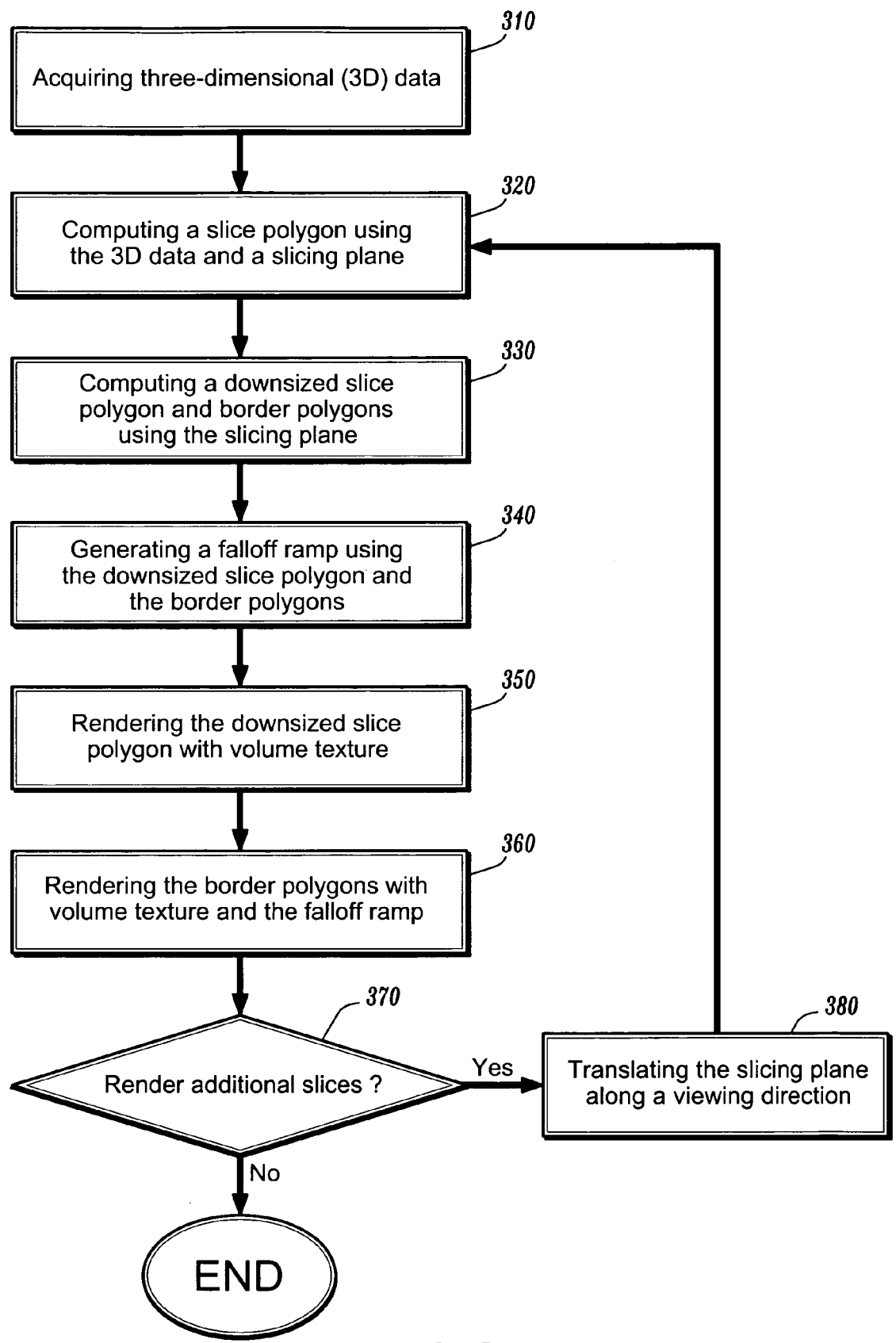
FIG. 3 is a flowchart showing an operation of a method for polygon-smoothing according to an exemplary embodiment of the present invention.

FIG. 3 is a flowchart showing an operation of a method for polygon-smoothing in texture-based volume rendering according to an exemplary embodiment of the present invention. As shown in FIG. 3, 3D data is acquired from a solid body, which may be, for example, an anatomical body part (step 310). This is accomplished by using the scanning device 205, in this example a CT scanner, which is operated at the operator's console 215, to scan the solid body thereby generating a series of 2D images associated with the solid body. The 2D images of the solid body may then converted or transformed into a 3D rendered image.

A slice polygon is then computed using the 3D data and a slicing plane (step 320). In particular, the slice polygon is computed by intersecting a bounding box of a volume of the 3D data with either view-aligned or volume aligned slicing planes. After computing the slice polygon, the slice polygon is downsized and boundary and/or border polygons are computed with a smoothing factor (step 330). The original slice polygon is downsized, for example, by finding a center of the polygon and using the center as an origin of a coordinate system of vertices associated with the polygon. The vertices associated with the polygon are then multiplied by a scaling matrix, and the resulting vertices become the inner vertices of the downsized polygon.

The boundary polygons are computed from the vertices of the slice polygon and the vertices of the downsized slice polygon. The smoothing factor is used to determine the width (e.g., the thickness) of the boundary polygons and thus the width of a falloff ramp. For example, when a high smoothing factor is used, a portion of the boundary polygons that the falloff ramp is applied to is large, whereas when the smoothing factor is low a portion of the boundary polygons that the falloff ramp is applied to is small.

The smoothing factor can be in the range from 0 to 1, where 0 indicates no smoothing and 1 indicates that the falloff ramp will be applied to the entire slice polygon. In operation, the smoothing factor may be set to have a default value of, for example, 0.05, thus having a small amount of smoothing. If a user desires to have additional smoothing at the boundaries of the downsized slice polygon, the user may change the smoothing factor at the operator's console 215 using, for example, a slider, on the display 260.

After computing the downsized slice polygon and the boundary polygons, the falloff ramp is generated (step 340). This is done by assigning the inner vertices of the downsized slice polygon an alpha value of 1 and the outer vertices of the downsized slice polygon (or the inner vertices of the boundary polygons) an alpha value of 0. A linear interpolation is then performed on the alpha values associated with the downsized slice polygon and boundary polygons.

The downsized slice polygon is then rendered with volume texture (step 350), and the border polygons are rendered with volume texture and the falloff ramp (step 360). The border polygons are rendered with the volume texture and the falloff ramp by combining the falloff ramp with the alpha values obtained from classification during rendering of the downsized slice polygon. This is done, for example, by multiplying an alpha value from classification of the downsized slice polygon with the alpha value associated with the falloff ramp at the boundary polygon. At this point, additional slices may be rendered (step 370) by translating the slicing plane along the viewing direction (step 380), computing a new slice polygon (step 320) and repeating steps 330–360. If no additional slices are to be rendered (step 370) the process may end.

Figure 4:
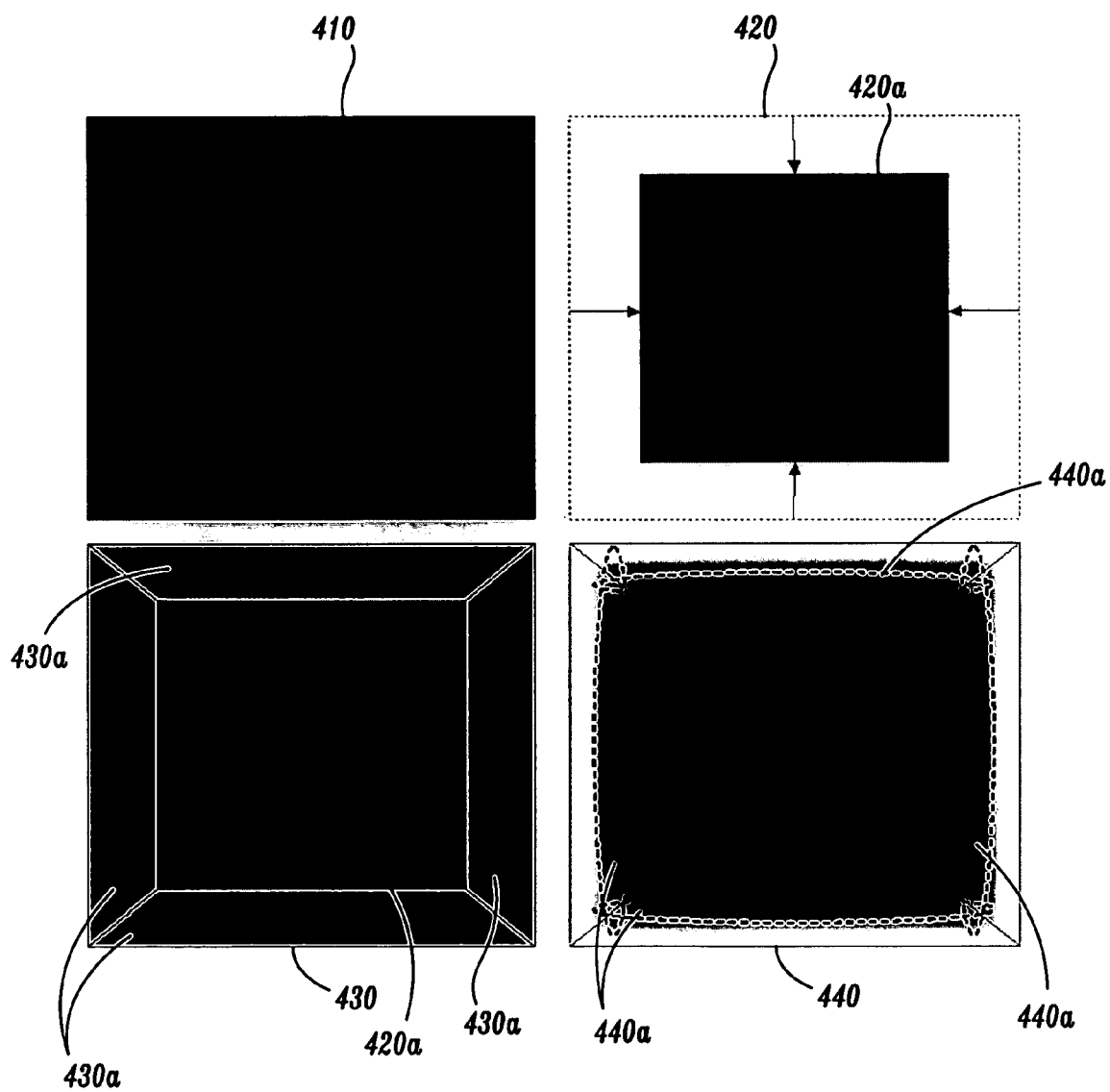
FIG. 4 is a sequence of images illustrating a slice polygon undergoing polygon-smoothing according to the present invention.
Figure 5A:
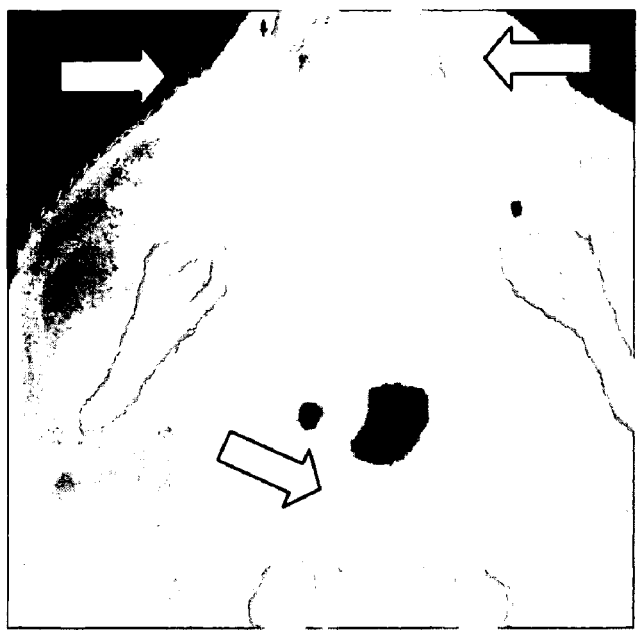
FIG. 5A is an image rendered with a conventional volume rendering technique.
Figure 5B:
FIG. 5B is an image rendered with a polygon-smoothing technique according to the present invention.

The method for polygon-smoothing in texture-based volume rendering just described is conceptually illustrated by a sequence of images shown in FIG. 4. In particular, a single slice polygon 410 is shown undergoing a downsizing in image 420. Boundary polygons 430a are then shown around the downsized slice polygon 420a in image 430. Image 440 illustrates a smooth alpha falloff 440a at the boundary of the downsized slice polygon 420a after a linear interpolation of the alpha values of the downsized slice polygon 420a and the boundary polygons 430a is performed. FIG. 5B is also included to illustrate an image rendered with the polygon-smoothing technique of the present invention. As shown in FIG. 5B, the artifacts indicated by arrows in FIG. 5A are removed and/or suppressed.

The following pseudo code demonstrates how to compute a downsized slice polygon and border and/or boundary polygons as discussed above with reference to FIGS. 3 and 4. In particular, the pseudo code finds a center of a polygon by averaging x, y, and z coordinates of a slice polygon. An array of inner vertices is then generated by computing an inner vertex for each vertex of the polygon. This is done by computing a position in between the center of the polygon and a selected vertex position.

A smoothing factor is used to determine the position of the inner vertex on a straight line between the center of the polygon and the selected vertex position. A smoothing factor of 0 results in the inner vertex being located at the same position as the polygon vertex and a smoothing factor of 1 results in the inner vertex being located at the same position as the center of the polygon. It should be understood that any smoothing factor between 0 and 1 results in the inner vertex being located at any position in between the polygon center and the selected vertex position.

```
Allocate InnerVertexList[numberOfVertices];
Float xSum = 0; // Sum of x coordinates
Float ySum = 0; // Sum of y coordinates
Float zSum = 0; // Sum of z coordinates
// Find center of slice polygon
For i=0 to numberOfVertices-1 {
    xSum = xSum + OuterVertexList[i].x;
    ySum = ySum + OuterVertexList[i].y;
    zSum = zSum + OuterVertexList[i].z;
}
Float cx = xSum / numberOfVertices; // center (average) x-coordinate
Float cy = ySum / numberOfVertices; // center (average) y-coordinate
Float cz = zSum / numberOfVertices; // center (average) z-coordinate
// Compute inner vertices
factor = 1.0 - smoothingFactor;
For i=0 to numberOfVertices-1 {
    InnerVertexList[i].x = cx + (OuterVertexList[i].x - cx) * factor;
    InnerVertexList[i].y = cy + (OuterVertexList[i].y - cy) * factor;
    InnerVertexList[i].z = cz + (OuterVertexList[i].z - cz) * factor;
}
```

From the list of inner and outer vertices, the downsized slice polygon and border polygons can now be rendered as demonstrated in the following pseudo code. In particular, the inner polygon (i.e., downsized slice polygon) is rendered as a polygon fan with a constant smoothing factor (e.g., an interpolation factor) of 1. Thus, no smoothing is applied to the inner polygon (as shown in the first loop). The border polygons are rendered as a series of quadrilateral polygons (as shown in the second loop), where each of the quadrilateral polygons consists of two vertices from the inner polygon and two vertices from the outer polygon (i.e., original slice polygon).

For the inner vertices, a smoothing factor of 1 is set, while for the outer vertices a smoothing factor of 0 is set. Graphics hardware such as a graphics card, which is located in the PC 210 or operator's console 215, will linearly interpolate the smoothing factor across the border polygon from the inside to the outside, producing a linear falloff and/or alpha ramp. The smoothing factor from the falloff ramp can be used during rasterization to modulate the alpha values acquired from classification. The last border polygon is then rendered outside the border polygon rendering loop because it consists of the first and last vertices in the inner and outer vertex list.

```
// render inner slice polygon without smoothing
Begin(TRIANGLE_FAN);
for i = 0 to numberOfVertices-1 {
    setInterpolationFactor(1.0);
    setTextureCoordinate(InnerVertexList[i]);
    setVertexPosition(InnerVertexList[i]);
}
End( );
// render border polygons with smoothing falloff
Begin(QUADS);
for i = 0 to numberOfVertices-2 {
    setInterpolationFactor(0);
    setTextureCoordinate(OuterVertexList[i]);
    setVertexPosition(OuterVertexList[i]);
    setTexrureCoordinate(OuterVertexList[i+1]);
    setVertexPosition(OuterVertexList[i+1]);
    setInterpolationFactor(1.0);
    setTextureCoordinate(InnerVertexList[i+1]);
    setVertexPosition(InnerVertexList[i+1]);
    setTextureCoordinate(InnerVertexList[i]);
    setVertexPosition(InnerVertexList[i]);
}
End( );
// render last border polygon
setInterpolationFactor(0);
setTextureCoordinate(OuterVertexList[numberOfVertices-1]);
setVertexPosition(OuterVertexList[numberOfVertices-1]);
setTextureCoordinate(OuterVertexList[0]);
setVertexPosition(OuterVertexList[0]);
setInterpolationFactor(1.0);
setTextureCoordinate(InnerVertexList[0]);
setVertexPosition(InnerVertexList[0]);
setTextureCoordinate(InnerVertexList[numberOfVertices-1]);
setVertexPosition(InnerVertexList[numberOfVertices-1]);
```

Figure 6:
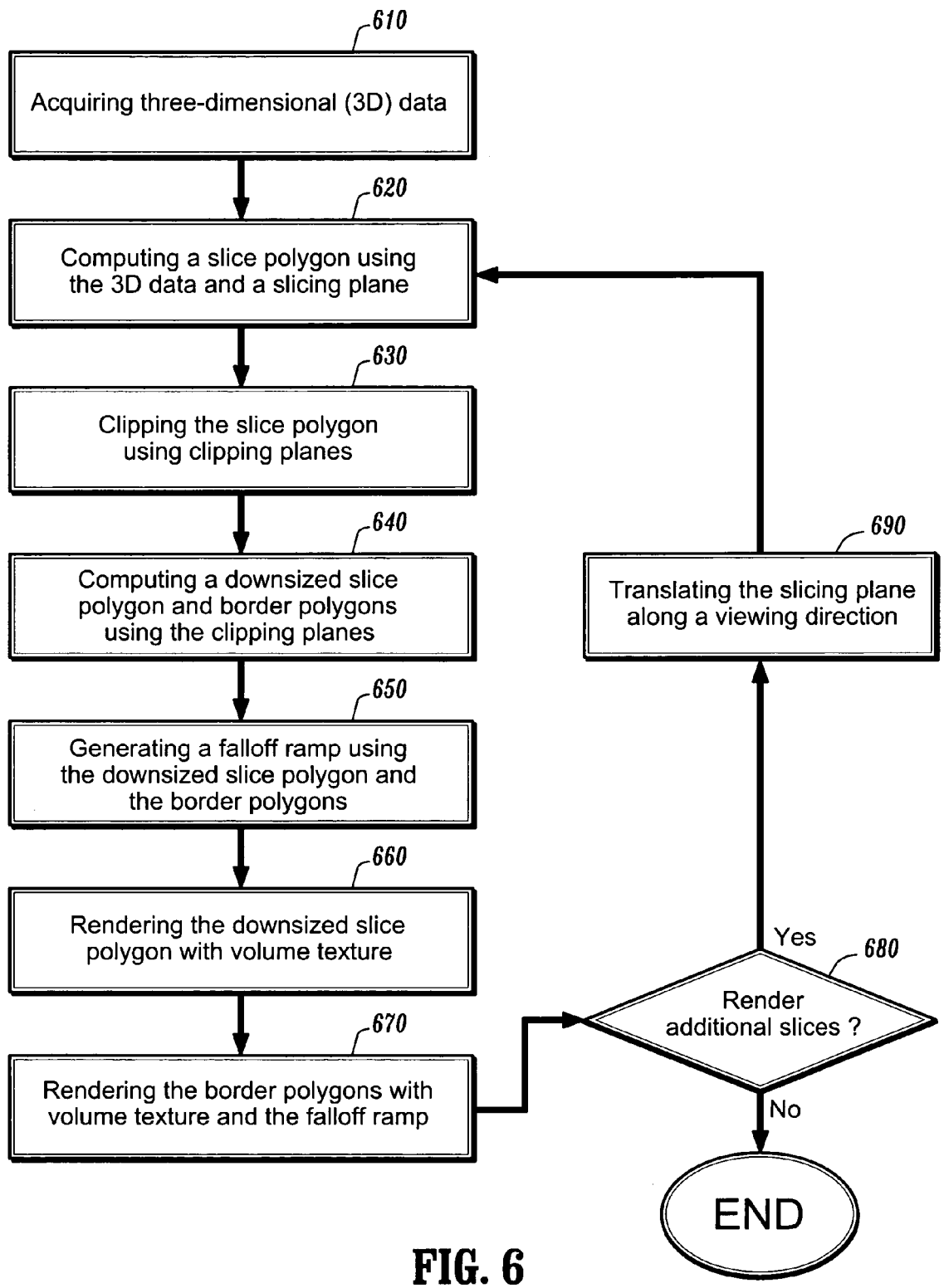
FIG. 6 is a flowchart showing an operation of a method for polygon-smoothing according to another exemplary embodiment of the present invention.

FIG. 6 is a flowchart showing an operation of a method for polygon-smoothing in texture-based volume rendering according to another exemplary embodiment of the present invention. In particular, FIG. 6 illustrates a polygon-smoothing technique for smoothing the boundaries of clipping planes. This is done by adding a step to the flowchart shown in FIG. 3, which provides for the clipping of the slice polygon using clipping planes (step 630), and then computing a downsized slice polygon and border polygons using the clipping planes (step 640) in place of the slicing planes.

The step of clipping the slice polygon using clipping planes is done by graphics software available in the PC 210 or operator's console 215. To enable polygon smoothing at the boundaries of the clipping planes, the slice polygons must be clipped before they are sent to the graphics hardware. A clip plane can be defined in 3D using a plane equation $Ax+By+Cz+D=0$, where A, B, C, and D define the position and orientation of the plane in 3D. All points with coordinates (x,y,z,w) that satisfy the plane equation lie on the plane in 3D space and all points on one side of the plane, e.g., the points that satisfy Ax+By+Cz+D<0, will be clipped using a conventional clipping technique such as the Sutherland-Hodgman polygon clipping algorithm.

It is to be understood that because some of the constituent system components and method steps depicted in the accompanying figures may be implemented in software, the actual connections between the system components (or the process steps) may differ depending on the manner in which the present invention is programmed. Given the teachings of the present invention provided herein, one of ordinary skill in the art will be able to contemplate these and similar implementations or configurations of the present invention.

It is to be further understood that the present invention may be implemented in various forms of hardware, software, firmware, special purpose processors, or a combination thereof. In one embodiment, the present invention may be implemented in software as an application program tangibly embodied on a program storage device (e.g., magnetic floppy disk, RAM, CD ROM, DVD, ROM, and flash memory). The application program may be uploaded to, and executed by, a machine comprising any suitable architecture.

It should also be understood that the above description is only representative of illustrative embodiments. For the convenience of the reader, the above description has focused on a representative sample of possible embodiments, a sample that is illustrative of the principles of the invention. The description has not attempted to exhaustively enumerate all possible variations. That alternative embodiments may not have been presented for a specific portion of the invention, or that further undescribed alternatives may be available for a portion, is not to be considered a disclaimer of those alternate embodiments. Other applications and embodiments can be straightforwardly implemented without departing from the spirit and scope of the present invention. It is therefore intended, that the invention not be limited to the specifically described embodiments, because numerous permutations and combinations of the above and implementations involving non-inventive substitutions for the above can be created, but the invention is to be defined in accordance with the claims that follow. It can be appreciated that many of those undescribed embodiments are within the literal scope of the following claims, and that others are equivalent.

What is claimed is:

1. A method for polygon-smoothing in texture-based rendering of a 3D volume of image data of an anatomical body part, comprising:
   receiving the 3D volume of image data;
   slicing the 3D volume of image data into a plurality of slice polygons;
   downsizing a slice polygon of the plurality of slice polygons and determining boundary polygons around the downsized slice polygon using a smoothing factor, wherein the downsized slice polygon comprises first vertices and the boundary polygons comprise second vertices;
   generating a falloff ramp between the first vertices of the downsized slice polygon and the second vertices of the boundary polygons; and
   rendering the downsized slice polygon with texture-based volume rendering and the boundary polygons with texture-based volume rendering and the falloff ramp by multiplying an alpha value of the downsized slice polygon with an alpha value of the falloff ramp.

2. The method of claim 1, further comprising:
   acquiring the 3D volume of image data.

3. The method of claim 2, wherein the 3D volume of image data is acquired by one of a computed tomographic (CT), helical CT, x-ray, positron emission tomographic (PET), fluoroscopic, ultrasound, and magnetic resonance (MR) imaging technique.

4. The method of claim 1, wherein the slice polygon is downsized by determining coordinates located between a center of the slice polygon and an original vertex position.

5. The method of claim 1, wherein the boundary polygons are located in an area between outer edges of the downsized slice polygon and outer edges of the slice polygon.

6. The method of claim 1, wherein the smoothing factor defines a width of the boundary polygons, wherein the width of the boundary polygons is a width of the falloff ramp.

7. The method of claim 1, wherein the falloff ramp is generated by assigning a first alpha value to the first vertices of the downsized slice polygon and a second alpha value to the second vertices of the boundary polygons and performing a linear interpolation on the first and second alpha values.

8. The method of claim 1, further comprising:
   clipping the slice polygon using clipping planes.

9. A system for polygon-smoothing in texture-based rendering of a 3D volume of image data of an anatomical body part, comprising:
   a memory device for storing a program;
   a processor in communication with the memory device, the processor operative with the program to:
   receive the 3D volume of image data;
   slice the 3D volume of image data into a plurality of slice polygons;
   downsize a slice polygon of the plurality of slice polygons and determine boundary polygons around the downsized slice polygon using a smoothing factor, wherein the downsized slice polygon comprises inner vertices of the slice polygon and the boundary polygons comprise outer vertices of the slice polygon;
   generate a falloff ramp between the inner vertices of the slice polygon and the outer vertices of the slice polygon; and
   render the downsized slice polygon with texture-based volume rendering and the boundary polygons with texture-based volume rendering and the falloff ramp by multiplying an alpha value of the downsized slice polygon with an alpha value of the falloff ramp.

10. The system of claim 9, wherein the processor is further operative with the program code to:
    acquire the 3D volume of image data.

11. The system of claim 10, wherein the 3D volume of image data is acquired by one of a computed tomographic (CT), helical CT, x-ray, positron emission tomographic (PET), fluoroscopic, ultrasound, and magnetic resonance (MR) imaging technique.

12. The system of claim 9, wherein the slice polygon is downsized by determining coordinates located between a center of the slice polygon and an original vertex position.

13. The system of claim 9, wherein the boundary polygons are located in an area between edges of the downsized slice polygon and edges of the slice polygon.

14. The system of claim 9, wherein the smoothing factor defines a width of the boundary polygons, wherein the width of the boundary polygons is a width of the falloff ramp.

15. The system of claim 9, wherein the falloff ramp is generated by assigning a first alpha value to the inner vertices of the slice polygon and a second alpha value to the outer vertices of the slice polygon and performing a linear interpolation on the first and second alpha values.

16. The system of claim 9, wherein the processor is further operative with the program code to:
clip the slice polygon using clipping planes.

17. A computer program product comprising a computer readable medium having computer program logic recorded thereon for polygon-smoothing in texture-based rendering of a 3D volume of image data of an anatomical body part, the computer program logic comprising:
program code for receiving the 3D volume of imaae data;
program code for slicing the 3D volume of image data into a plurality of slice polygons;
program code for downsizing a slice polygon of the plurality of slice polygons and determining boundary polygons around the downsized slice polygon using a smoothing factor, wherein the downsized slice polygon comprises first vertices and the boundary polygons comprise second vertices;
program code for generating a falloff ramp between the first vertices of the downsized slice polygon and the second vertices of the boundary polygons; and
program code for rendering the downsized slice polygon with texture-based volume rendering and the boundary polygons with texture-based volume rendering and the falloff ramp by multiplying an alpha value of the downsized slice polygon with an alpha value of the falloff ramp.

18. A computer-based system for polygon-smoothing in texture-based rendering of a 3D volume of image data of an anatomical body part, comprising:
means for receiving the 3D volume of image data;
means for slicing the 3D volume of image data into a plurality of slice polygons;
means for downsizing a slice polygon of the plurality of slice polygons and determining boundary polygons around the downsized slice polygon using a smoothing factor, wherein the downsized slice polygon comprises first vertices and the boundary polygons comprise second vertices;
means for generating a falloff ramp between the first vertices of the downsized slice polygon and the second vertices of the boundary polygons; and
means for rendering the downsized slice polygon with texture-based volume rendering and the boundary polygons with texture-based volume rendering and the falloff ramp by multiplying an alpha value of the downsized slice polygon with an alpha value of the falloff ramp.

19. A method for removing artifacts from a three-dimensional (3D) volume of data acquired from of an anatomical body part during texture rendering, comprising:
computing a slice polygon using the 3D volume of data and a slicing plane;
computing a downsized polygon and border polygons surrounding the downsized polygon using a smoothing factor, wherein the downsized polygon comprises inner vertices of the slice polygon and the border polygons comprise outer vertices of the slice polygon;
generating a linear alpha ramp between the inner vertices of the slice polygon and the outer vertices of the slice polygon; and
rendering the downsized polygon with texture rendering and the border polygons with texture rendering and the linear alpha ramp by multiplying an alpha value of the downsized slice polygon with an alpha value of the linear alpha ramp.

20. The method of claim 19, further comprising:
clipping the slice polygon using clipping planes.

21. The method of claim 19, further comprising:
translating the slicing plane along a viewing direction.

* * * * *